United States Patent [19]

Amberkar

[11] 4,352,684
[45] Oct. 5, 1982

[54] FILTER BAG

[75] Inventor: Suresh D. Amberkar, Framingham, Mass.

[73] Assignee: Dennison Manufacturing Company, Framingham, Mass.

[21] Appl. No.: 280,397

[22] Filed: Jul. 6, 1981

Related U.S. Application Data

[63] Continuation of Ser. No. 127,294, Mar. 5, 1980, abandoned, which is a continuation of Ser. No. 846,658, Oct. 28, 1977, abandoned, which is a continuation-in-part of Ser. No. 607,540, Aug. 25, 1975, abandoned.

[51] Int. Cl.³ .................................................. B01D 46/02
[52] U.S. Cl. ........................................ 55/382; 55/487; 55/DIG. 2
[58] Field of Search ................. 55/381, 382, 486, 487, 55/527, 528, DIG. 2

[56] References Cited

U.S. PATENT DOCUMENTS

| | | | |
|---|---|---|---|
| 2,629,459 | 9/1953 | Hammond et al. | 55/527 |
| 2,692,654 | 10/1954 | Pryor | 55/487 |
| 2,795,290 | 6/1957 | Butsch et al. | 55/527 |
| 2,804,166 | 8/1957 | Stevens et al. | 55/382 |
| 2,964,127 | 12/1960 | Korn | 55/382 |
| 3,067,602 | 12/1962 | Lubben et al. | 55/381 |
| 3,190,059 | 6/1965 | Bauder et al. | 55/382 |
| 3,208,205 | 9/1965 | Arms et al. | 55/487 |
| 3,251,475 | 5/1966 | Till et al. | 55/527 |
| 3,273,321 | 9/1966 | Bauder et al. | 55/528 |
| 3,307,332 | 3/1967 | Grace et al. | 55/103 |
| 3,422,602 | 1/1969 | Jackson | 55/381 |
| 3,570,224 | 3/1971 | Clements | 55/382 |

FOREIGN PATENT DOCUMENTS

| | | | |
|---|---|---|---|
| 1809832 | 8/1969 | Fed. Rep. of Germany | 55/524 |
| 1958494 | 5/1971 | Fed. Rep. of Germany | 55/486 |
| 1220888 | 1/1971 | United Kingdom | 55/382 |

*Primary Examiner*—David L. Lacey
*Attorney, Agent, or Firm*—George E. Kersey

[57] ABSTRACT

A filter bag for dry copiers, i.e. copiers which employ dry toners. The bag comprises a porous cover and a porous filter mass in the form of loose packing within the cover.

7 Claims, 8 Drawing Figures

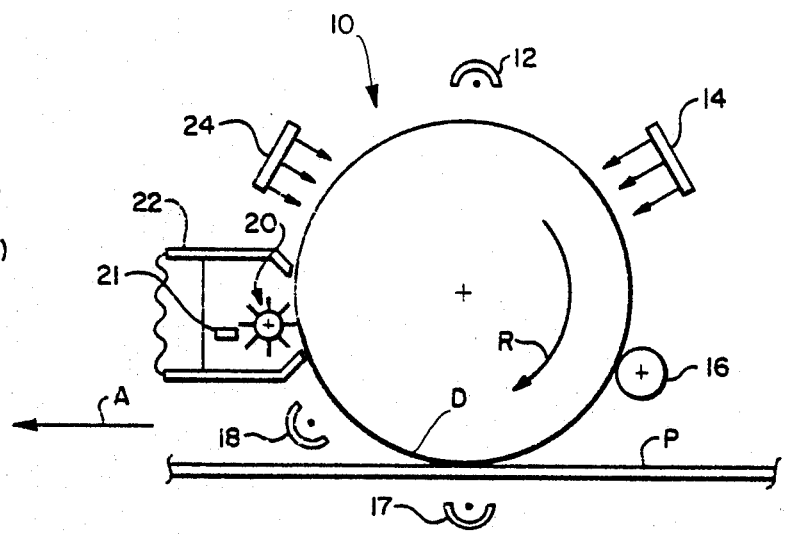
FIG. 1 (PRIOR ART)
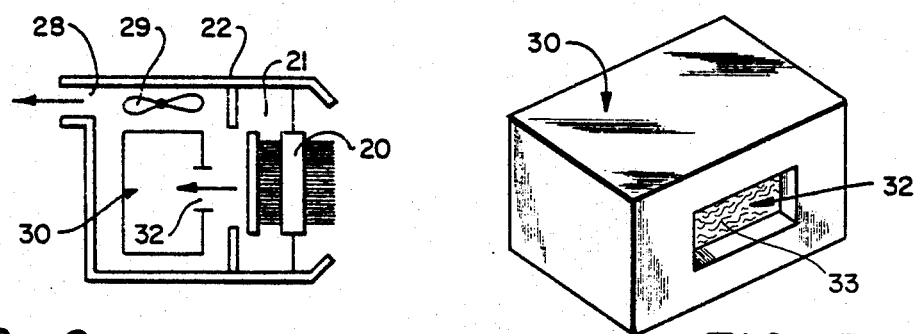
FIG. 2 (PRIOR ART)
FIG. 3
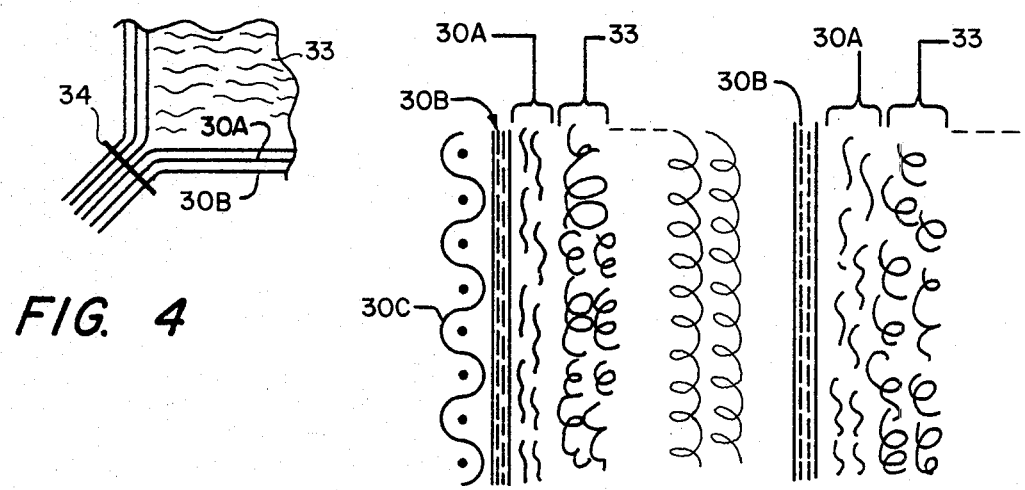
FIG. 4
FIG. 5
FIG. 6

FILTER BAG

BACKGROUND OF THE INVENTION

This is a continuation of Ser. No. 127,294, filed Mar. 5, 1980, now abandoned, which is a continuation of Ser. No. 846,658, filed Oct. 28, 1977, now abandoned, which is in turn a continuation-in-part of Ser. No. 607,540 filed Aug. 25, 1975 now abandoned. The invention relates to the filtering of fine particulate matter, i.e. matter having dimensions in the micron range, and more particularly to the filtering of dry toner particles.

In certain kinds of photo copiers, particulate matter, known as "dry toner" and ranging in size from about 1 to 40 microns, is used for form visible images. During this process dust is created which requires filtering. The filters that are in common use typically employ a porous material and are relatively fragile. Consequently the filters often become damaged during shipment and installation.

Consideration has been given to the use of a protective layer with such a filter, but it has been assumed that this would interfere with the proper filtering function.

In addition the filters that are commonly employed for the removal of particulate matter of micron size in, for example, dry toner copier machines, have a tendency to become clogged with particles after only limited usage. As a result, frequent replacement of the filters is necessary. Moreover the tendency of conventional filters to become clogged after only short usage tends to subject the associated fans to irregular loading. When the filter is first installed and in a relatively unclogged condition air flows freely through it, but as the filter becomes filled with particles the passage of air is impeded and the work load on the fan is significantly increased.

Accordingly, it is an object of the invention to provide a filter system which is suitable for removing the entire range of particulate matter encountered in the use of small size particles, especially those in the micron range.

Another object of the invention is to achieve a particle filter which is less subject to damage during shipment and installation.

Another object of the invention is to improve the loading characteristics of filters so that the life of the filter can be extended considerably beyond the level at which conventional filters become so clogged and unsuitable for further filtering. A related object is to increase the maintenance interval during which filter replacement is necessary in order to assure satisfactory performance of machines in which particulate matter, especially in the micron range, is used. Another related object is to achieve a particulate filter which exhibits a substantially uniform loading characteristic over a period of extended use. A related object is to provide for uniform loading on the equipment that is used in operating filters for particulate matter of micron size.

SUMMARY OF THE INVENTION

In accomplishing the foregoing and related objects the invention provides a porous bag cover and porous filter mass in the form of loose packing within the cover. The packing is in the form of loosely lofted material which has a greater internal surface area than that of the bag cover. The loose packing can completely fill the bag cover without any impairment of filter efficiency.

In accordance with one aspect of the invention the porous filter mass can be employed with multiple layers of filter materials, which desirably have different levels of coarseness. The porous mass advantageously constitutes a prefiltering medium of relatively coarse porosity. This is followed by a layer of polyester fibers of medium porosity, and a further layer advantageously of glass fibers constituting a relatively fine filter.

The prefilter is in the form of loose fibrous material with a mass in the range from about 75 grams per cubic foot to about 250 grams per cubic foot. A mass of about 100 grams per cubic foot (3.5 grams per liter) is particularly advantageous. In addition, the prefilter has an internal surface area for deposition of particles greater than the accessible internal surface area of the other filter elements, which is also greater than for the same mass compressed. The prefilter desirably is constructed to be essentially non-clogging throughout its life. In addition to taking the form of loose packing within and filling the bag, the prefilter may also be a coherent front layer at the bag inlet. The preferred material is polypropylene, but glass, polyester fibers and other materials are also suitable. The prefilter material desirably ranges in thickness from 1 to 15 denier with a preferred range from 3 to 6 denier.

The layer filter following the loose loft prefilter is desirably a layer of high strength synthetic fiber from one-half to two inches in thickness, preferably being one inch in thickness and a blend of fibers of different thicknesses (e.g., 6 and 25 denier). The high strength fiber layer may be used as a sole cover for the prefilter, but it advantageously is backed by a second layer of resin bonded glass fibers or less than one inch in thickness, preferably about 0.5 inch.

In addition, a porous shield of synthetic fiber or natural fibers may be used to reinforce and protect the glass layer from damage during installation and handling. It has been discovered that this shield, instead of detracting from performance, as might be expected by the imposition of an additional air flow impedance, enhances the overall filter operation.

DESCRIPTION OF THE DRAWINGS

Other aspects of the invention will become apparent after considering several illustrative embodiments taken in conjunction with the drawings in which:

FIG. 1 is a diagram of an illustrative copying machine for use with the invention;

FIG. 2 is a top view of a filter housing for the machine of FIG. 1;

FIG. 3 is a perspective view of a filter bag for use in the housing of FIG. 2;

FIG. 4 is a diagram showing constructional details for the filter bag of FIG. 3;

FIG. 5 is a cross-sectional view showing wall details for one embodiment of a filter bag in accordance with the invention;

FIG. 6 is another embodiment showing wall details of a filter bag in accordance with the invention;

DETAILED DESCRIPTION

Figure 7:
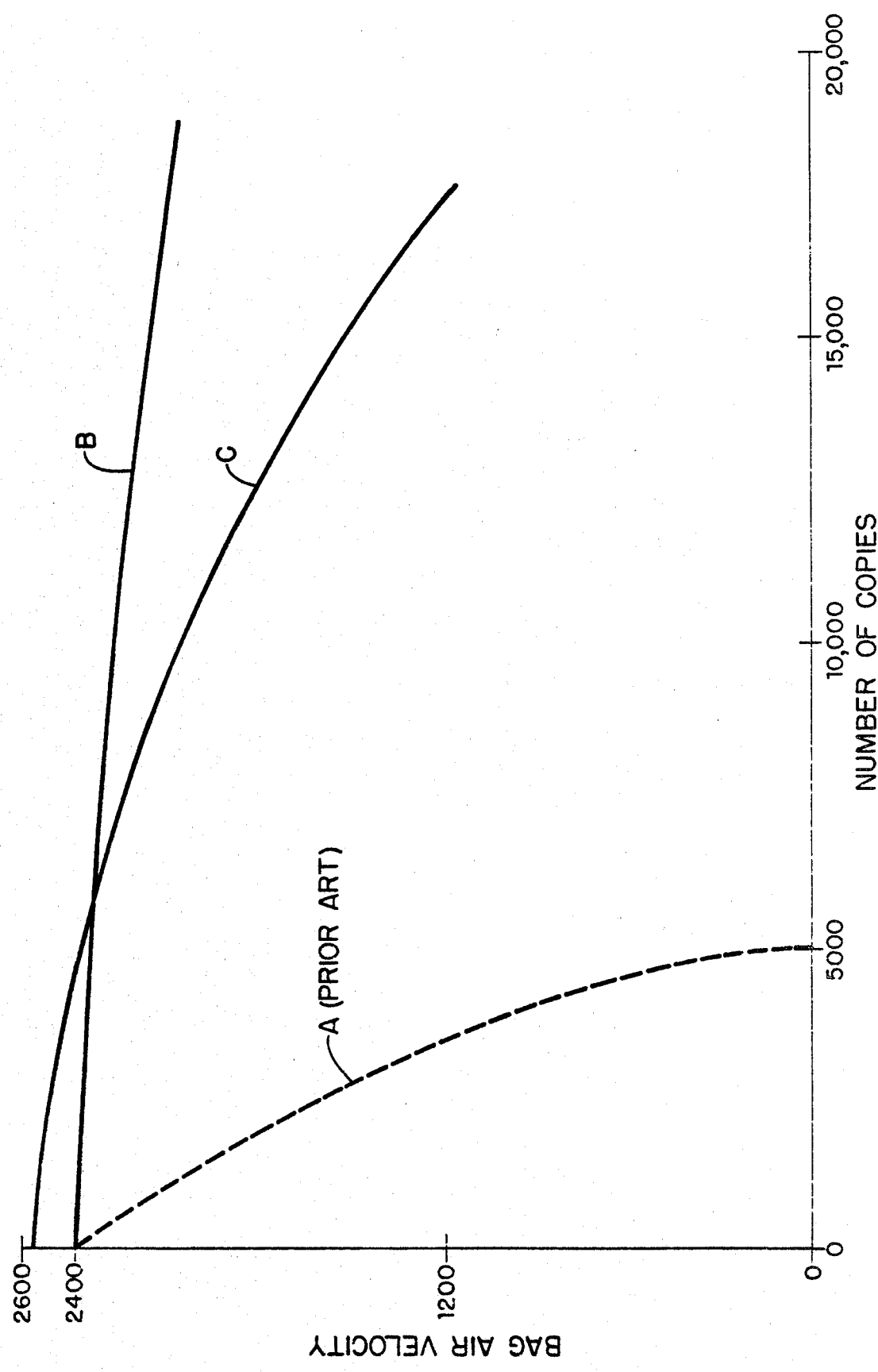
FIG. 7 is a set of graphs illustrating the performance of filter bags in accordance with the invention and comparing that performance with filter bags of the prior art.

Referring now to FIG. 1, a respresentative setting for the invention is provided by an illustrative copying machine 10, which includes a feeder for moving paper P with respect to a photosensitive drum D that rotates in the direction indicated by an arrow R. During each operating cycle, the photosensitive drum D is first charged by an electric discharge corona 12 and exposed to an optical image at position 14 to provide an electrostatic counterpart image on the drum. Dry toner particles are then applied by a magnetic brush 16 to provide a charged particle image on the drum. This is followed by transfer of the charged particles to the paper P by the attractive effect of a corona discharge 17. Residual toner particles remaining on the drum are loosened by an alternating current corona 18 and are removed by contact with a brush 20. Exposure to a light source 24 then erases any residual charges on the drum and moves past the charging corona 12 to initiate a new cycle of operation.

The particle removing brush 20 is contained in a housing 22 that is shown in further detail in the top view of FIG. 2. The housing 22 includes a flicker bar 21 to clean the brush and a filter bag 30 that is positioned to receive an air stream with entrained toner particles that have been flicked from the brush 20 by the bar 21. As the particle laden air stream is pumped to the exhaust 28 by a fan 29 the particles are trapped in the bag 30.

FIG. 3. shows the bag 30 in isometric form, including its entrance 32, which may be cut away without reinforcement, or may be reinforced with a stapled cardboard lip. The bag 30 is seen to be filled with a porous, loose loft prefilter 33.

FIG. 4 shows constructional details for the bag 30 with the walls formed by layers 30A and 30B butted at adjacent marginal portions and secured by a line of stapling 34. The porous, loose loft prefilter is shown at 33.

Further details for two different kinds of wall construction according to the invention are illustrated in FIGS. 5 and 6. In both, a prefiltering medium 33 that fills the bag is in contact with an intermediate filter layer 30A, which is, in turn, backed by an outer glass fiber layer 30B. The embodiment of FIG. 5 includes a further protective scrim layer 30C that is provided to avoid damage to the glass layer 30B during packing and installation.

A preferred construction of the layers is as follows:

The prefilter 33 is desirably formed by puff expanded polyester or polypropylene. It includes long, continuous fibers which provide an open and resilient non-clogging entry face at the inlet 32 of FIG. 3 and a similar departure face for air leaving the bag through the layer 30A.

The layer 30A is desirably a one-inch thick, nonwoven blend of 75 weight percent, 6 denier, polyester fibers and 25 percent, 25 denier, polyester fibers. It has a weight of about 6.0 ounces per square yard.

The outer layer 30B is desirably 0.5 inch thick of borosilicate glass fibers in a felt bonded with bunolic resin. The weight is about 11 grams per square foot and the glass fibers have a diameter of about 0.00016 inch.

Finally, the protective shield 30C is desirably a spun bonded reinforcing sheath that is die cut from 0.8 ounce per square yard nylon surfacing net scrim.

It will be appreciated that the loose loft prefilter 33 may be used without multiple filter layers and can be used with layer 30A or 30B above.

The performance of various filter bags in a representative dry copier machine is illustrated by FIG. 7, showing how filter air flow is reduced as the number of copies increases.

Curve A applies to various filter bags of the prior art; Curve B is for the bag 30 with the prefilter 33 and multilayers 30A and 30B, while Curve C applies to a bag with a porous, loose loft prefilter 33 filling a bag formed by a layer 30A or 30B above. The bags of curves B and C may be used with or without the protective shield 30C.

In the case of the prior bags of Curve A, the filter air velocity diminishes to about zero, due to clogging, after about 5000 copies. By contrast, filter bags in accordance with the invention perform well beyond about 20,000 copies, as indicated by curves B and C. There is substantially less degrading due to clogging exhibited by the bags of Curve C than by the bags of Curve B, showing the improvement afforded by the construction of FIG. 5.

The overall porosity in accordance with the invention is believed to range from 1 to 40 microns, with the prefilter 33 advantageously having a porosity ranging from about 25 to about 40 microns, the layer 30A advantageously having a range from about 10 to about 30 microns and the second layer 30C advantageously having a range from about 1 to about 15 microns.

Figure 8:
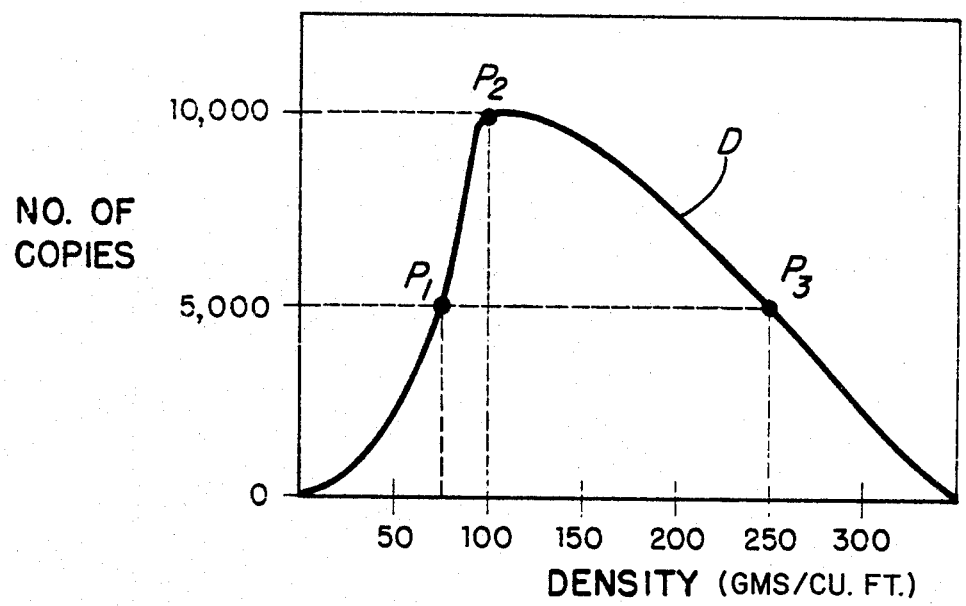
FIG. 8 is a graph showing a relationship between number of copies and density of the filter mass.

It is believed that the relationship between the number of copies which can be made before there is a ten percent reduction in efficiency using a filter in accordance with the invention is as shown in curve D of the graph of FIG. 8, in terms of the density of the filter mass in grams per cubic foot. The lower inflection point $P_1$ is believed to occur at a density of about 75 grams per cubic foot. Below the point $P_1$, the filter suffers a significant loss in filter function. Optimum filtering takes place at the peak $P_2$ of the curve D for a filter having a density of about 100 grams per cubic foot. The upper inflection point $P_3$ of the curve D occurs at a density of about 250 grams per cubic foot, beyond which this again is a significant reduction in efficiency.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

I claim:

1. A filter bag comprising
a porous bag cover, and
a porous filter mass within said bag cover,
said filter mass being in the form of loosely lofted material which has a greater internal surface area than that of said bag cover, and
said loosely lofted material being puff expanded to completely fill said bag and having a density in the range from about 75 grams per cubic foot to about 250 grams per cubic foot.

2. A filter bag as defined in claim 1 wherein said cover comprises a filter medium.

3. A filter bag as defined in claim 1 wherein said filter mass comprises polypropylene.

4. A filter bag as defined in claim 1 wherein said mass comprises polyester.

5. A filter bag as defined in claim 1 wherein said filter mass comprises fibers in the range of from 1 to 15 denier.

6. A filter bag as defined in claim 5 wherein the range is from 3 to 6 denier.

7. A filter bag as defined in claim 1 wherein the cover comprises polyester material.

* * * * *